(12) United States Patent
Grasreiner et al.

(10) Patent No.: US 10,997,804 B2
(45) Date of Patent: May 4, 2021

(54) DIAGNOSIS OF A CHARGE CYCLE BEHAVIOR OF AN INTERNAL COMBUSTION ENGINE

(71) Applicant: Bayerische Motoren Werke Aktiengesellschaft, Munich (DE)

(72) Inventors: Sebastian Grasreiner, Munich (DE); Florian Hartl, Munich (DE); Christian Kuklinski, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/045,885

(22) PCT Filed: May 15, 2019

(86) PCT No.: PCT/EP2019/062397
§ 371 (c)(1),
(2) Date: Oct. 7, 2020

(87) PCT Pub. No.: WO2019/238338
PCT Pub. Date: Dec. 19, 2019

(65) Prior Publication Data
US 2021/0065476 A1 Mar. 4, 2021

(30) Foreign Application Priority Data

Jun. 11, 2018 (DE) .................... 10 2018 209 252.4

(51) Int. Cl.
*G07C 5/08* (2006.01)
*F02B 75/18* (2006.01)
(Continued)

(52) U.S. Cl.
CPC ............ *G07C 5/0808* (2013.01); *F02B 75/02* (2013.01); *F02B 75/18* (2013.01); *F02D 41/22* (2013.01);
(Continued)

(58) Field of Classification Search
CPC ....... G07C 5/0808; G07C 5/008; F02D 41/22; F02D 2200/101; F02D 2200/024;
(Continued)

(56) References Cited

U.S. PATENT DOCUMENTS 6,659,068 B2 * 12/2003 Urushihara ........... F02D 35/027
123/295
2015/0233289 A1 8/2015 Younkins et al.
2018/0080372 A1 * 3/2018 Vogel ........................ F16C 3/28

FOREIGN PATENT DOCUMENTS

DE 10 2014 203 033 A1 8/2015
DE 10 2015 220 022 A1 4/2017
DE 10 2016 210 296 A1 12/2017

OTHER PUBLICATIONS

International Search Report (PCT/ISA/210) issued in PCT Application No. PCT/EP2019/062397 dated Sep. 11, 2019 with English translation (four (4) pages).
(Continued)

*Primary Examiner* — Russell Frejd
(74) *Attorney, Agent, or Firm* — Crowell & Moring LLP

(57) ABSTRACT

A method and diagnostic tool diagnoses a charge cycle behavior of an internal combustion engine with a plurality of cylinders. The method determines a diagnosis time window within a torque dropout of one of the cycles of the internal combustion engine, and associates a deviation type with the diagnosis time window determined.

17 Claims, 4 Drawing Sheets

(51) Int. Cl.
*F02D 41/22* (2006.01)
*F02B 75/02* (2006.01)
*G07C 5/00* (2006.01)

(52) U.S. Cl.
CPC ........ *G07C 5/008* (2013.01); *F02B 2075/027* (2013.01); *F02B 2075/1816* (2013.01); *F02D 2200/024* (2013.01); *F02D 2200/101* (2013.01)

(58) Field of Classification Search
CPC .. F02B 75/02; F02B 75/18; F02B 2075/1816; F02B 2075/027
See application file for complete search history.

(56) References Cited

OTHER PUBLICATIONS

German-language Written Opinion (PCT/ISA/237) issued in PCT Application No. PCT/EP2019/062397 dated Sep. 11, 2019 (six (6) pages).
German-language Office Action issued in German Application No. 10 2018 209 252.4 dated Jan. 14, 2019 with English Translation (12 pages).
German-language Decision to Grant issued in German Application No. 10 2018 209 252.4 dated Feb. 13, 2020 with English Translation (10 pages).

* cited by examiner

FIG. 1
a)
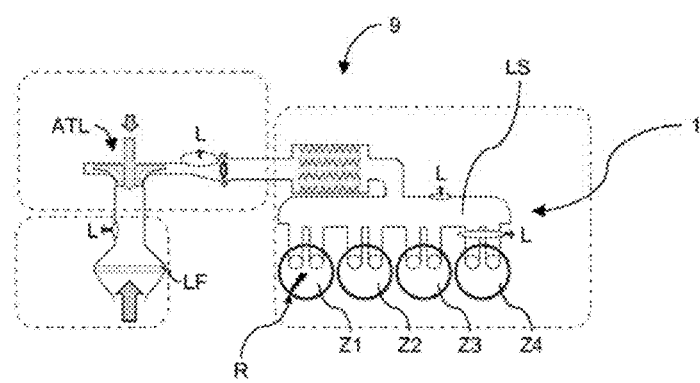
b)
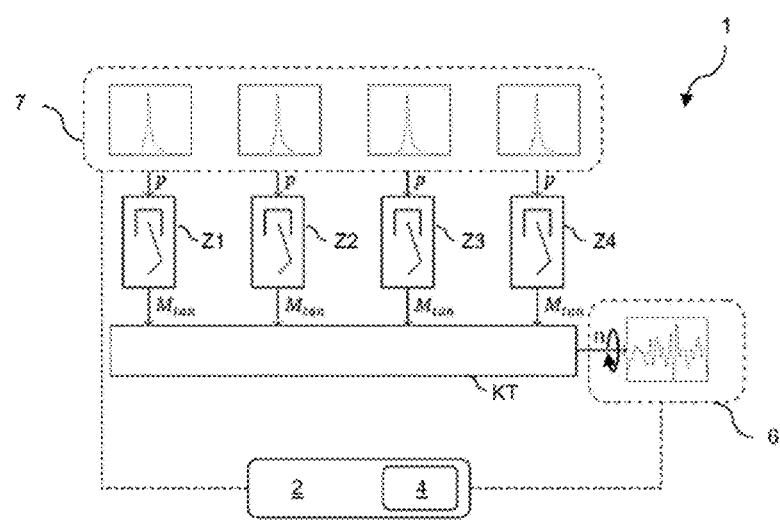
c)
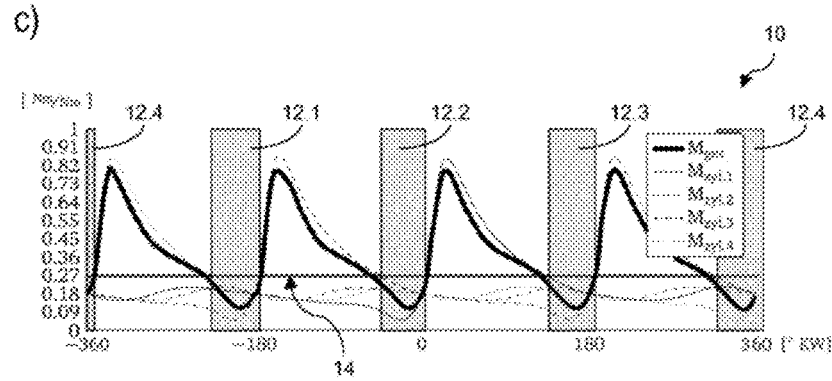

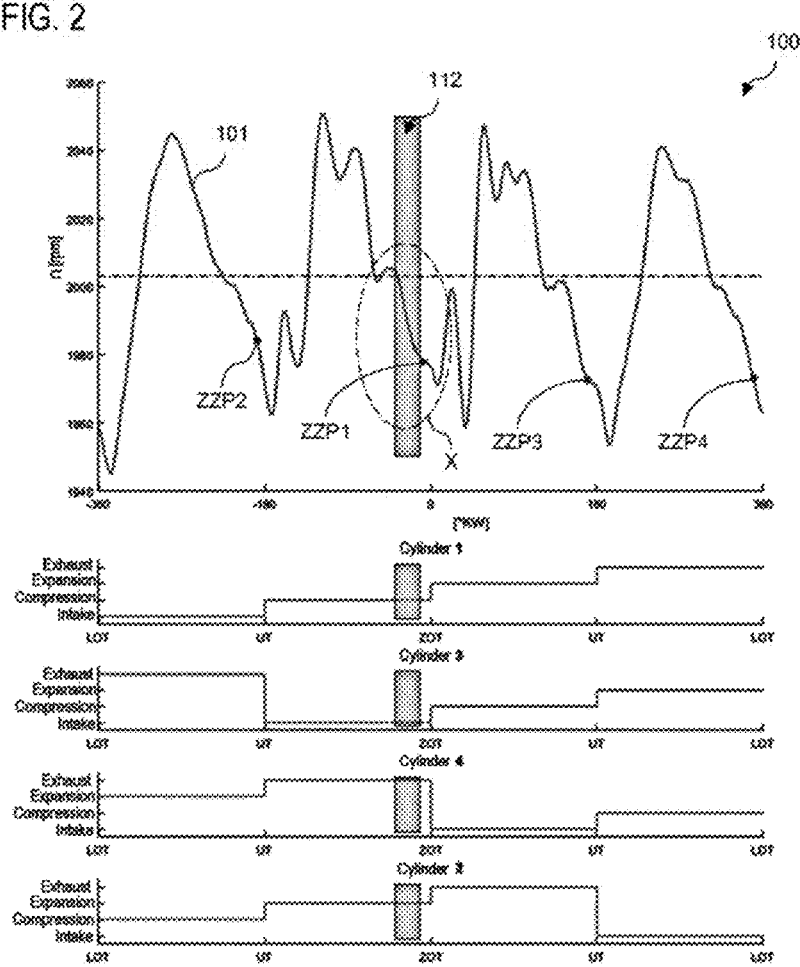
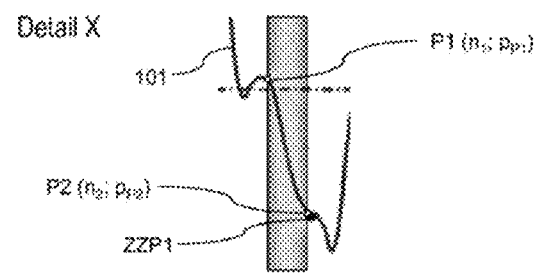

DIAGNOSIS OF A CHARGE CYCLE BEHAVIOR OF AN INTERNAL COMBUSTION ENGINE

BACKGROUND AND SUMMARY OF THE INVENTION

The invention relates to a method and a diagnostic tool for the diagnosis of charge exchange behavior of an internal combustion engine, and to an internal combustion engine with multiple cylinders with a diagnostic tool of said type.

Rough engine running and misfiring are a fundamental problem in internal combustion engines, which can lead at least to an erroneous build-up of the propulsion torque. The fact that an erroneous build-up of torque is occurring can generally be observed from the output variable of the engine rotational speed—that is to say from the rotational speed development of the crankshaft.

However, the mere knowledge that a fault of some kind is present is normally not sufficient to provide a remedy. To eliminate the fault, positive diagnosis of the malfunction is necessary, wherein the causes of misfiring and/or rough engine running may differ widely.

With present diagnostic systems, an accurate diagnosis is highly complex and requires various items of information from different subsystems of the internal combustion engine. Even a distinction between mechanical problems in the cylinder (for example in the tribological pairing), on the one hand, and problems in terms of the gas charging (charge exchange) or in the air path, on the other hand, is difficult to establish during a workshop visit by the customer with the functionally impaired engine.

A workshop visit with a rough-running engine can therefore be disappointing for the customer with regard to the likelihood of success in attaining an accurate first diagnosis.

Against this background, it is an object of the invention to make possible improved identification of a fault causing rough engine running and/or misfiring, and in particular to provide improved diagnosis of charge exchange behavior of an internal combustion engine with multiple cylinders.

This object is achieved by means of a method for the diagnosis of charge exchange behavior of an internal combustion engine, a diagnostic tool for diagnosing charge exchange behavior of an internal combustion engine, and an internal combustion engine, in accordance with the claimed invention.

According to one aspect of the invention, a method for diagnosing charge exchange behavior of an internal combustion engine with multiple cylinders is provided, which method is suitable in particular for identifying a fault causing rough engine running and/or misfiring. The method has at least the following steps:

a) Determining a diagnosis time window within a torque dropout of one of the strokes of the internal combustion engine. A diagnosis time window is to be understood in particular to mean a coherent time period as a fraction of a stroke (for example of one of the strokes of a four-stroke combustion) of the combustion in the internal combustion engine. In the present case, a torque dropout is to be understood in particular to mean a crank angle range in which the cylinder under consideration, and/or all cylinders of the engine, do not make any contextually relevant contribution to a propulsion torque.

b) Identifying at least one of the cylinders, which is in a compression stroke at the start of the diagnosis time window. The identification of this/these cylinder(s) may be performed in particular by reading out available information from an operation model, in particular of the engine controller. In particular, in the case of a four-stroke engine with four cylinders, the one cylinder which is in a compression stroke at the start of the diagnosis time window is identified.

c) Assigning a deviation type to the identified cylinder in a manner dependent on an ascertained rotational speed development of the internal combustion engine during the diagnosis time window. A rotational speed development is to be understood in the present case as the manner in which a rotational speed present at the crankshaft of the internal combustion engine develops during the diagnosis time window. A deviation type is to be understood in the present case to mean a particular peculiarity of the rotational speed development, which is assigned to a particular fault type which leads to rough engine running and/or misfiring. In particular, here, different predetermined rotational speed developments are assigned to different deviation types.

According to one embodiment, for the assignment of the deviation type, the following steps are performed:

c1) Ascertaining a peculiarity of a charge exchange characteristic variable on the basis of the ascertained rotational speed development. In particular, a cylinder pressure variable which is dependent on the rotational speed development and/or a rotational speed profile and/or a curve parameter of a development of the cylinder pressure variable may be used as charge exchange characteristic variable.

c2) Comparing the ascertained peculiarity with predetermined peculiarities of the charge exchange characteristic variable which are assigned to different deviation types. In particular, a setpoint-actual value comparison is performed between the ascertained peculiarity and previously ascertained peculiarities which are regarded as representative for different particular fault types—which result in rough engine running and/or misfiring.

c3) Assigning a deviation type to the determined diagnosis time window in accordance with the result of the comparison. In particular, a deviation type is assigned if the comparison has yielded a sufficient correlation—which is to be specified in accordance with routine considerations—between the ascertained peculiarity and a predetermined peculiarity of the charge exchange characteristic variable.

The result is then in particular a rough statement regarding the area in which the fault causing the rough engine running and/or the misfiring lies; for example, as a result of the method, it is possible to distinguish whether the deviation or the fault can be assigned to piston friction, to a preparation of a combustion mixture or to a feed of fresh air and/or recirculated exhaust gas. Furthermore, by means of a process of elimination, it is also possible to specify areas of the causal fault where the fault is suspected not to lie.

According to one embodiment, in order to perform diagnosis for all cylinders in the internal combustion engine, a torque dropout is respectively identified for each cylinder, at the start of which torque dropout said cylinder is in the compression phase, and a corresponding diagnosis time window is determined in said torque dropout.

According to a further aspect of the invention, a diagnostic tool for the, in particular on-board, diagnosis of charge exchange behavior of an internal combustion engine, in particular of a four-stroke internal combustion engine, with multiple, in particular four, cylinders, is provided, which diagnostic tool serves in particular for identifying a fault causing rough engine running and/or misfiring. The diagnostic tool has at least one acquisition unit which is configured to acquire a rotational speed of a crankshaft of the internal combustion engine, in particular a corresponding sensor unit and/or access to a stored suitable operation model.

Furthermore, the diagnostic tool has a processing unit which is at least configured i) to control the acquisition unit. The processing unit is additionally configured ii) to determine a diagnosis time window within a torque dropout of one of the strokes of the internal combustion engine, iii) to identify at least one cylinder which is in a compression stroke at the start of the diagnosis time window, and iv) to assign a deviation type to the identified cylinder in a manner dependent on an ascertained rotational speed development of the internal combustion engine during the diagnosis time window.

According to a further aspect of the invention, an internal combustion engine with multiple, in particular three, four or six cylinders is provided, which has at least one diagnostic tool according to an embodiment of the invention.

The invention is particularly easy to implement in an internal combustion engine with four cylinders, which is in particular in the form of a four-stroke internal combustion engine, owing to the isochronal alternation between the individual strokes of the various cylinders. Other numbers of cylinders are of course also possible in other embodiments.

The invention is based inter alia on the consideration that the cycles of a four-stroke internal combustion engine (intake, compression, working cycle, exhaust) overlap in terms of time between the individual cylinders—they occur in parallel with one another in different cylinders.

The invention is now based inter alia on the concept of identifying a time window directly prior to the ignition in the cycles, which time window contains no significant build-up of propulsion torque, that is to say in which the crankshaft continues to rotate substantially exclusively owing to inertia. In this time window, the drop in rotational speed (for example start of time window vs. end of time window) is then for example identified. This is made up of friction losses in the mechanism and the piston braking owing to the gas compression.

If, in this time window, diagnosis is performed on specifically that cylinder which is presently in its compression stroke, the influence thereof on the rotational speed profile can be examined most effectively: this is because, in the compression phase, a cylinder has the greatest influence on the profile of the rotational speed, because it brakes the mechanism with the greatest intensity owing to the compression of the gas spring; with much greater intensity than the braking imparted by the other strokes.

The approach according to the invention of ascertaining the torque development during the—substantially—torque-free diagnosis time window makes it possible, with different, possibly combinable, charge exchange characteristic variables, to perform, on the basis of this torque development, a comparison with previously ascertained, fault-specific peculiarities—possibly stored in an operation model—of the respective charge exchange characteristic variables.

This makes it possible to roughly localize the fault causing rough engine running and/or misfiring to these predetermined deviation types (in the present case also referred to as fault types if the deviation is associated with a relevant erroneous build-up of torque). Deviation types or fault types may for example be: 1) insufficient or excessive charging of the cylinder with fresh air and/or recirculated exhaust gas; 2) insufficient compression of the cylinder; 3) excessive mechanical friction in the cylinder; 4) premature ignition and/or other irregular combustion.

With the rotational speed acquisition, for this purpose, use is made in particular of existing sensor means (rotational speed acquisition) with enhanced functions. The capabilities of the existing rotational speed acquisition at the engine, in particular at the crankshaft, have hitherto not been utilized to perform such a rough classification of the causal faults.

The invention makes it considerably easier to establish causes for rough running problems including misfiring, in particular by identification of the problem in the gas charging (charge exchange) or a blockage of the air path.

Online data acquisition of the diagnosis results during driving operation, which is to be performed according to one embodiment, makes it possible for the workshop to access real driving situations and thus in particular permits a more directed execution of servicing operations and/or a faster execution of maintenance work. As a consequence of the latter, this gives rise to lower warranty costs, greater customer satisfaction and/or fewer repeat repairs.

According to various embodiments of the invention, diagnostic methods are possible on the basis of different charge exchange characteristic variables. Advantageous embodiments described below present possible method steps for different charge exchange characteristic variables.

According to one embodiment, in order to support an implementation of the method with the lowest possible processing intensity, for the ascertainment of the rotational speed development, a rotational speed difference is calculated from a rotational speed value at the start of the diagnosis time window and a rotational speed value at the end of the diagnosis time window.

In particular, then, a pressure characteristic number calculated on the basis of the ascertained rotational speed difference, said rotational speed difference being ascertained in particular in the compression stroke, is used as charge exchange characteristic variable.

For this purpose, according to one embodiment, it is sufficient to perform a balancing of the rotational speed drop with the aid of mechanical equations. This balancing makes it possible to infer the compression pressure prior to the ignition. The compression pressure is directly related to the cylinder charge and thus to the enclosed air mass in the individual cylinder. A deviation detection can thus relate running roughness faults to the charge exchange or rule out the charge exchange as a cause.

This implementation of an analytical method by means of a formula system in the time domain can be used effectively in particular above mean engine load and up to mean rotational speeds, in particular in the case of smooth and continuous rotational speed profiles, and is based in particular on a calculation of a pressure characteristic number in the cylinder during the compression from the rotational speed profile. An exemplary use is illustrated in the first exemplary embodiment of the description of the figures.

In order to permit a diagnosis even if no rotational speed signal can be read out in the diagnosis time window, in one embodiment, for the ascertainment of the rotational speed development, a pressure profile in the cylinder during the diagnosis time window is ascertained, in particular is estimated and/or read out from an operation model, wherein the rotational speed development is in particular derived from the ascertained pressure profile. In particular, then, at least one curve parameter of the ascertained pressure profile is used as charge exchange characteristic variable. Such an approach is however very processing-intensive, and should therefore be used in particular if the rotational speed signal is not available with sufficient quality.

This recursive method in the time domain can be used effectively in particular above mean engine load and up to mean rotational speeds, and is based in particular on a definition of suitable parameters of a pressure profile for the forward simulation of an erroneous rotational speed signal. An exemplary use is illustrated in the second exemplary embodiment of the description of the figures.

In one embodiment, the diagnostic tool is, for the assignment of the deviation type, configured to ascertain a peculiarity of a charge exchange characteristic variable on the basis of the ascertained rotational speed development, to compare the ascertained peculiarity with predetermined peculiarities of the charge exchange characteristic variable which are assigned to different deviation types, and to assign a deviation type to the determined diagnosis time window in accordance with the result of the comparison.

According to one embodiment, in order to be able to implement the various proposed embodiments of a method according to the invention with suitable hardware, the diagnostic tool is configured to carry out methods according to any embodiments of the invention.

Further features, advantages and possible uses of the invention will emerge from the following description in conjunction with the figures.

BRIEF DESCRIPTION OF THE DRAWINGS

FIGS. 1 a-c show, in schematic views, an internal combustion engine with a diagnostic tool according to an exemplary embodiment of the invention, wherein FIG. 1a illustrates the installation environment of the internal combustion engine, FIG. 1b illustrates relevant parameters, and FIG. 1c illustrates torque contributions to the crank drive of the internal combustion engine versus the time.

FIG. 2 shows an image with a diagram of a rotational speed development of a working cycle of the internal combustion engine according to FIG. 1 and an illustration of the strokes of the individual cylinders.

FIG. 3 shows an enlarged detail from the diagram as per FIG. 2.

DETAILED DESCRIPTION OF THE DRAWINGS

Figure 4:
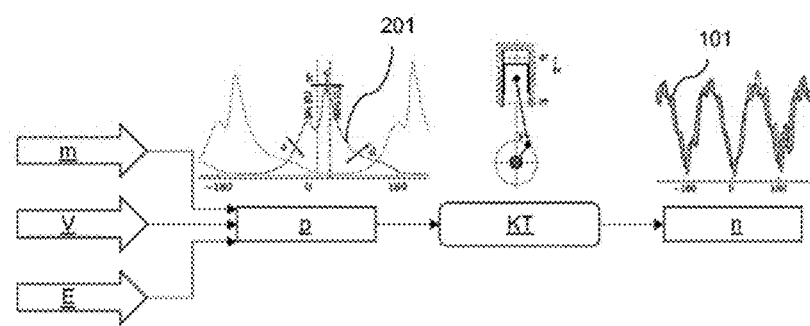
FIG. 4 shows an image of the implementation of a method according to an exemplary embodiment of the method, with replication of the rotational speed signal profile by means of a variation of the cylinder pressure profile by adaptation of operating parameters of the internal combustion engine as per FIG. 1.

FIG. 1a illustrates an internal combustion engine 1 in its installation environment, wherein the internal combustion engine 1 is, in the exemplary embodiment, a four-stroke engine with 4 cylinders Z1, Z2, Z3 and Z4.

Of the installation environment, the illustration of FIG. 1a shows in particular the intake system 9 with the air filter LF at the air inlet, the exhaust-gas turbocharger ATL and a charge-air cooling arrangement and the air manifold LS in the direction of the cylinders Z. Also shown are potential leakage regions L at the pipelines between the various components.

By way of example, a potential mechanical failure R at the piston and/or at the cylinder inner wall, which would potentially lead to greatly increased friction, is signaled.

FIG. 1b illustrates the internal combustion engine 1 in a more detailed schematic view. The internal combustion engine 1 has the cylinders Z1, Z2, Z3 and Z4, wherein all of the cylinders Z provide their torque contribution M to the crank drive KT. The internal combustion engine 1 additionally has a diagnostic tool 2 according to an exemplary embodiment of the invention, which diagnostic tool has a processing unit 4, a rotational speed acquisition unit 6 and a pressure acquisition unit 7 for the reference pressures from surroundings and air manifold or crankcase. The pressure acquisition unit 7 operates in particular by reading the values to be ascertained out of an operation model, for example of the engine controller.

From FIG. 1b, it can be seen inter alia that each cylinder Z can cyclically provide a torque contribution M to the crank drive KT in a manner dependent on the respective cylinder pressure p. The totality of the torque contributions results in a rotational speed n of a crankshaft of the crank drive KT which varies over time.

The reference pressure p can be used by the diagnostic tool 2 by means of the pressure acquisition unit 7, and the present rotational speed n can be used by the diagnostic tool 2 by means of the rotational speed acquisition unit 6 and the processing unit 4.

FIG. 1c illustrates a diagram of a torque development 100 with an exemplary torque profile 10 at the crank drive KT during normal operation versus the crank angle KW. It can be seen that the torque contribution M originates from different cylinders Z in an alternating manner. In the illustration, a torque threshold value 14 is shown, which is in particular arbitrarily set and determines the torque below which a torque contribution of a cylinder is considered insignificant. A torque dropout 12 within the meaning of the invention can consequently be identified if, in a particular time interval, the torque contributions of each cylinder are below the threshold value 14.

In the illustration of FIG. 1c, there are resulting torque dropouts 12.1, 12.2, 12.3 and 12.4 of slightly different length. Within these torque dropouts 12, it is possible in particular to define in each case one diagnosis time window 112, which may also (though need not) encompass the entire duration of the torque dropout. The end time of the diagnosis time window 112 may be determined in particular by the ignition time or by the time of a first noticeable release of heat after compression.

FIGS. 2 to 6 explain different exemplary embodiments of methods according to the invention. Here, FIGS. 2 and 3 relate to the first exemplary embodiment described below, and FIGS. 4 to 6 relate to the second exemplary embodiment described below.

FIRST EXEMPLARY EMBODIMENT (analytical method by means of a formula system in the time domain):

In the four-stroke process of an internal combustion engine, there are regions in the degrees crank angle scale (abscissa of the torque profile 10) in which no significant torque conversion occurs (in particular below the threshold value 14). In these time periods, the crankshaft is decelerated by acting frictional and load resistances. The definitive decelerating resistances are in particular the corresponding load demand, the friction of the mechanism R and in particular also the compression of the gas charge of the cylinder in which ignition is next to be performed.

Through steady-state balancing of the decelerating resistances by means of rotational speed measurement of the crankshaft KT in the correct time window 12, it is possible to infer the cylinder charge. Before corresponding ignition of the mixture, it is still possible for statements to be made regarding the charge exchange quality, and, in the event of a fault, for better differentiation of the causes to be performed.

FIG. 2 is a sketch of an exemplary diagram 100 of a rotational speed development 101 of a four-stroke cycle (one working cycle (ASP): charge exchange top dead center (LOT)→intake→bottom dead center (UT)→compression→ ignition top dead center (ZOT)→expansion→UT→exhaust) of the internal combustion engine 1.

The flow diagram 100 shows the course 101 of the engine rotational speed n over one working cycle (ASP) of a 4-cylinder Otto-cycle engine. The ignition times (ZZP) and an exemplary possible diagnosis time window 112 for the cylinder Z1 in compression, on which diagnosis is to be performed, are marked. The associated working strokes of the physical cylinders Z1-Z4 are shown underneath.

This example of a four-cylinder engine shows which region 112 of the crank angle scale can be utilized for the charge exchange diagnosis. The diagnosis time window 112 lies, for the cylinder Z1 on which diagnosis is to be performed, at the end of the compression, directly before the ignition of the mixture; for the cylinder Z3, at the end of the intake stroke; for the cylinder Z4, at the end of the exhaust stroke; and, for the cylinder Z2, at the end of the working stroke, wherein a relevant release of torque does not occur in any of the cylinders Z (cf. threshold value 14 in FIG. 1c).

The diagnosis time window 112 must in particular be selected such that that cylinder which has most recently performed work is no longer causing any acceleration of the crankshaft, and ignition has not yet taken place in that cylinder which is next to perform work.

In the exemplary embodiment, basic prerequisites for the definition of the diagnosis time window 112 are as follows: 1) no dominant release of heat (differential torque build-up negligible, because the time precedes the ignition in the compression and/or follows the pressure pulse in the working cycle); and/or 2) outlet valve open (otherwise the piston braking action must be taken into account); and/or 3) inlet valve open and dethrottled (VVT), otherwise the piston braking action resulting from throttling and gas spring must also be taken into account.

By way of example, in the exemplary embodiment as per FIG. 1, the diagnosis time window 112 for cylinder Z1 has been defined as being from 30° before ZZP1 to ZZP1 (with respect to the crank angle KW). The limits are dependent on a present engine operating point and may be adapted to this in a flexible manner as long as the basic prerequisites 1-3 mentioned in the preceding paragraph are not infringed. The dynamic adaptation of the limits of the diagnosis time $$\overline{M_{\tan}} = [A_K \cdot [p_{zyl}(\varphi) - p_0] - m_{osz} \cdot \ddot{s}(\varphi)] \cdot r_K \cdot \frac{\sin(\varphi + \beta)}{\cos\beta}$$

window 112 is also possible for dynamic driving operation in a manner dependent on boundary conditions such as an ignition angle and the cylinder pressure profile.

Formula system and derivation:

A power balance is intended—on the basis of a measured rotational speed difference—to permit a comparison between a setpoint cylinder pressure and an actual state:

$$\frac{d}{dt}\left(\frac{1}{2} \cdot J_0 \cdot \omega^2\right) = (M_{tan} - M_R - M_L) \cdot \omega$$

Formula symbol Meaning
$J_0$, $J$ General/component mass moment of inertia
$\varphi$ Angular position of the crankshaft
$\omega$ Angular speed
$M_{tan}$ Moment resulting from gas force in the cylinder and oscillating mass force
$M_R$ Moment resulting from friction losses
$M_L$ Moment resulting from load demand
$M_N$ Component moment resulting from rotational mass inertia
$n_{mot}$ Present engine rotational speed By differentiation, substitution and introduction of a mass moment (splitting of the inertia components), the following equation is obtained:

$$J \cdot \dot{\omega} = \sum_i M_i = M_{tan} - M_R - M_L - M_M$$

If one expediently divides the equation into a "steady component" and an "alternating component", then the following sub-equations are obtained:

"Steady component":

$$\overline{M_{\tan}} = \overline{M_R} - \overline{M_L}$$

The balancing of the steady component is based on a steady-state operating point. The mean provided torque maintains the constant mean rotational speed, because it corresponds to the moment demand from load and friction.

"Alternating component":

$$J \cdot \dot{\omega} = \tilde{M}_{tan} - \tilde{M}_R - \tilde{M}_M \quad (1)$$

A conversion from time-based derivation to the crank-angle-based difference calculation is performed with the aid of the relationship $$\omega = \frac{d\varphi}{dt} = \pi \cdot \frac{n_{mot}}{30} \quad (2)$$

by $$\dot{\omega} \approx \left(\frac{\pi}{30}\right)^2 \cdot nmot \cdot \frac{\Delta nmot}{\Delta\varphi}$$

The definitive variables from equation (1) will be detailed further for the evaluation. The relationship for the resulting moment from the gas force inside the cylinder is obtained as:

Formula symbol Meaning
$A_K$ Piston top area=const.
$r_K$ Effective radius of the crankshaft corresponds to half of the stroke=const.
$l_{Pl}$ Connecting-rod length=const.
$m_{osz}$ Oscillating mass fraction corresponds to piston assembly and proportional connecting-rod mass=const.
$p_{zyl}$ Pressure prevailing in the cylinder $p_0$ Reference pressure, crankcase pressure
$\beta(\varphi)$ Connecting-rod pivot angle as a function of the crank angle position
$\ddot{s}(\varphi)$ Piston acceleration as a function of the piston position Further detailing of the variable factors from equation (3) yields the following:

$$\ddot{s}(\varphi,\dot{\varphi},\ddot{\varphi})=r_K\cdot\ddot{\varphi}\cdot\sin\varphi+r_K\cdot\dot{\varphi}^2\cdot\cos\varphi\pm r_K/2\cdot\ddot{\varphi}\cdot\sin(2\cdot\varphi)+r_K\cdot\dot{\varphi}^2\cdot\lambda_{Pl}\cos(2\cdot\varphi)$$

Assuming a constant mean rotational speed $n_{mot}$, the relationship for the piston acceleration simplifies to:

$$\ddot{s}_{red}(\varphi,\dot{\varphi})=r_K\cdot\dot{\varphi}^2\cdot(\cos\varphi+\lambda_{pl}\cos(2\varphi)) \quad (4)$$

The assumption leads to a negligible error. The influence of the angular acceleration results in a negligibly small deviation over the entire characteristic map $$\beta(\varphi)=\arcsin(\lambda_{Pl}\cdot\sin(\varphi)) \quad (4.5)$$

Thrust rod ratio $$\lambda_{Pl}=r_K/l_{Pl} \quad (5)$$

$$p_{zyl}=\bar{p}_{zyl} \quad (6)$$

Relationship to the ambient pressure $$p_0=p_{umg} \quad (7)$$

or, as is also used below, the
relationship to the crankcase pressure $$p_0=p_{KurbGeh}=p_{umg}-DPS \quad (8)$$

where DPS represents the negative pressure in the intake pipe.

The frictional moment from equation (1) may be represented in various ways. It is on the one hand possible for a model to be introduced which reflects measurement data for a particular operating point of the diagnosis. One expedite approach here would be functional linking of the term to the rotational speed, the load and the oil temperature.

It is however assumed below that the diagnosis is performed at fixedly defined steady-state load points. In this way, the frictional moment for this load point can be assumed to be invariant.

$$\tilde{M}_R=\text{const.} \quad (9)$$

The same approach is likewise used for the component moment resulting from rotational mass inertia and the mass moment of inertia.

$$\tilde{M}_M=\text{const.} \quad (10)$$

$$J=\text{const.} \quad (11)$$

A suitable selection of diagnosis constants at the steady-state operating point permits easy retrospective application of the parameters.

Solving equation (1) for the gas moment yields the following:

$$\widetilde{M_{tan}}=J\cdot\dot{\omega}+\tilde{M}_R+\tilde{M}_M$$

After inserting the relationships from equations (9) to (11), it is possible to conclude the following simplification with the application constant KRM:

$$\widetilde{M_{tan}}=J\cdot\dot{\omega}+K_{RM} \quad (12)$$

Application of the diagnosis:

The detail X from FIG. 2, that is to say the rotational speed development 101 versus the crank angle KW during the diagnosis time window 112 with the measurement points P1 and P2 in the compression of cylinder Z1, is plotted in FIG. 3. At the measurement point P1, $p_{P1}(t_1,n_1)$ applies for the cylinder pressure $p_{P1}$ in the cylinder Z1, and at the measurement point P2, $p_{P2}(t_2,n_2)$ applies for the cylinder pressure $p_{P2}$. As can be seen, the measured rotational speed n decreases during the diagnosis time window 112, such that $n_1 > n_2$.

The gradient of the angular speed from equation (2) will be expanded. The rotational speed to be ascertained must in this case be averaged, and constants will again be indicated.

$$\dot{\omega}\approx\left(\frac{\pi}{30}\right)^2\cdot\overline{n}_{mot}\cdot\frac{\Delta n_{mot}}{\Delta\varphi} \quad (13)$$

$$\dot{\omega}\approx\left(\frac{\pi}{30}\right)^2\cdot\frac{n_{mot2}+n_{mot1}}{2}\cdot\frac{n_{mot2}-n_{mot1}}{\varphi_2-\varphi_1}$$

$$\dot{\omega}\approx\frac{1}{2}\cdot\left(\frac{\pi}{30}\right)^2\cdot\frac{n_{mot2}^2-n_{mot1}^2}{\varphi_2-\varphi_1}$$

$$\dot{\omega}\approx K_\omega\cdot\frac{n_{mot2}^2-n_{mot1}^2}{\varphi_2-\varphi_1}$$

The term for the tangential moment from equation (3) will be expanded below to include the relationships from equations (4) to (8), and constants will be indicated.

$$\widetilde{M_{tan}}=\left[\frac{(p_1+p_2-2\cdot p_{umg}+2\cdot DPS)}{2}\cdot A_K-m_{osz}\cdot\ddot{s}(\varphi)\right]\cdot r_K\cdot\frac{\sin(\varphi+\beta)}{\cos\beta} \quad (13.5)$$

$$\widetilde{M_{tan}}=\left[\frac{(p_1+p_2-2\cdot p_{umg}+2\cdot DPS)}{2}\cdot A_K-m_{osz}\cdot\ddot{s}(\varphi)\right]\cdot K_K$$

with a kinematics constant for the steady-state point at which the diagnosis takes place $$K_K=r_K\cdot\frac{\sin(\varphi+\beta)}{\cos\beta} \quad (14)$$

After inserting equations (14) and (13) into equation (12), and solving for the cylinder pressures and combining all constants, the following is obtained:

$$\left[\frac{(p_1+p_2-2\cdot p_{umg}+2\cdot DPS)}{2}\cdot A_K-m_{osz}\cdot\ddot{s}(\varphi)\right]\cdot K_K= \quad 15)$$

$$J\cdot K_\omega\cdot\frac{n_{mot2}^2-n_{mot1}^2}{\varphi_2-\varphi_1}+K_{RM}$$

$$\frac{p_1+p_2}{2}=\frac{J\cdot K_\omega}{K_K\cdot A_K}\cdot\frac{n_{mot2}^2-n_{mot1}^2}{\varphi_2-\varphi_1}+\frac{K_{RM}}{K_K\cdot A_K}+\frac{m_{osz}\cdot\ddot{s}(\varphi)}{A_K}+p_{umg}-DPS$$

$$\frac{p_1+p_2}{2}=K_1\cdot\frac{n_{mot2}^2-n_{mot1}^2}{\varphi_2-\varphi_1}+K_2+\frac{m_{osz}\cdot\ddot{s}(\varphi)}{A_K}+p_{umg}-DPS$$

All pressure variables and rotational speeds in equation (15) are measurable at the times P1 and P2. Suitable indication measurement technology such as is known per se solves the required physical variables in a crank-angle-based manner or at least averaged over multiple working cycles. In addition or alternatively to the indication measurement technology, it is possible to resort to data from a suitable operation model, for example of the engine controller. The kinematics constant $K_K$ can be tabulated and used as a function of the piston position.

The influence of the rotational speed $n_{mot}$ with regard to the oscillatory masses may for example be calculated in real time or stored in the form of a lookup table of a suitably stored operation model with regard to rotational speed and load on the control unit.

The reduced piston acceleration (4) can be formulated as follows for the two discrete points:

$$\ddot{s}_{red}(\varphi, \dot{\varphi}) = \qquad (15.5)$$
$$r_K \cdot \left[\frac{\frac{\pi}{30}(n_{mot1} + n_{mot2})}{2}\right]^2 \cdot \left[\cos\left(\frac{\varphi_1 + \varphi_2}{2}\right) + \cos(\varphi_1 + \varphi_2)\right]$$

The constants $K_1$ and $K_2$ may be determined on the basis of reference measurements (engine function or charge exchange OK).

Diagnostic procedure:

After determination of the application constants $K_1$ and $K_2$, the equation (15) can be used to determine the diagnostic cylinder pressure from the change in rotational speed in the compression:

$$\bar{p}_{zyl,diag} = K_1 \cdot \frac{n_{mot2}^2 - n_{mot1}^2}{\varphi_2 - \varphi_1} + K_2 + \frac{m_{osz} \cdot \ddot{s}_{red}(\varphi, n_{mot})}{A_K} + p_{umg} - DPS \qquad (16)$$

The diagnostic cylinder pressure $\bar{p}_{zyl,diag}$ is an indication for the pressure profile during the compression of the cylinder.

This is followed by an absolute evaluation, in which the diagnostic cylinder pressure $\bar{p}_{zyl,diag}$ is compared with a reference setpoint pressure $p_{zyl,soll}$ of the cylinder Z1 in order to narrow down a fault pattern:

$$thr_{low} \cdot p_{zyl,soll} \leq \bar{p}_{zyl,diag} \leq thr_{high} \cdot p_{zyl,soll}$$

If the diagnostic cylinder pressure $\bar{p}_{zyl,diag}$ does not lie in the permissible range around the setpoint pressure $p_{zyl,soll}$ (region spanned by threshold multipliers $thr_{low}$ and $thr_{high}$), then various conceivable fault patterns (that is to say deviation types and/or fault types) are defined, to which the ascertained diagnostic cylinder pressure $\bar{p}_{zyl,diag}$ is assigned:

| Relation $\bar{p}_{zyl,diag}$ | Fault pattern |
| --- | --- |
| too low | insufficient charging (priority: 1. fresh air 2. residual gas) |
| | insufficient compression of the cylinder |
| | further specific fault patterns |
| too high | excessive charging (priority: 1. fresh air, 2. residual gas) |
| | excessive mechanical friction → this would be evident at multiple or all cylinders |
| | premature ignition or other irregular combustion |
| | further specific fault patterns |

Alternatively or in addition, a relative evaluation may also be provided: the diagnostic cylinder pressures $\bar{p}_{zyl,diag}$ compared with one another. A correspondingly large deviation between these is indicative of a problem concerning equal distribution.

SECOND EXEMPLARY EMBODIMENT (recursive method in the time domain as parameter estimation method):

The aim of this exemplary embodiment, illustrated from FIG. 4 onward, of the diagnostic method is to replicate the rotational speed signal profile 101 by means of the variation of the cylinder pressure profile 201 by adaptation of parameters a, b, c and d (cf. FIG. 5), which describe, in a sufficiently accurate approximation, the peculiarity of the cylinder pressure profile and thus—in particular by means of a reversed application of the formula system from the first exemplary embodiment—also the peculiarity of the rotational speed signal profile 101.

An overview image relating to this exemplary method is illustrated in FIG. 4.

Under normal circumstances, that is to say in the fault-free situation, the air mass m, the fuel quantity V and the ignition energy E are utilized for accelerating the crankshaft KT. Peculiar to the fault-free situation is a characteristic profile of the profile 201 of the cylinder pressure p, which is a function of the input variables (m, V and/or E) thereof.

The intermittent manner of operation of the internal combustion engine 1—with mass inertia forces superposed thereon—then results in a particular rotational speed profile 101 (see the figure above rotational speed signal n).

The transmission path via the crank drive KT is provided by means of the mechanism thereof and fixedly defined vibration characteristics.

Thus—assuming a fault-free mechanism—the only influential variable is the profile 201 of the cylinder pressure p, which in turn is—in a sufficiently accurate approximation—dependent only on the input variables m, V and E thereof. It follows from this that features of all three input variables m, V and E are included in the rotational speed profile 101.

In particular if one of the input variables m, V or E has a fault or defect, this is reflected in the rotational speed signal n. Here, the peculiarity of the feature m, V or E is dependent on the superposed mass force. In particular, the peculiarity of the feature m, V or E is particularly pronounced if the influences of the mass forces are relatively minor (low rotational speeds n and/or high engine load).

It is also of significance that each subsystem which provides the input variables m, V and/or E for the combustion has different effects on the profile 201 of the pressure p in the cylinder Z1 in the event of a defect.

Figure 5:
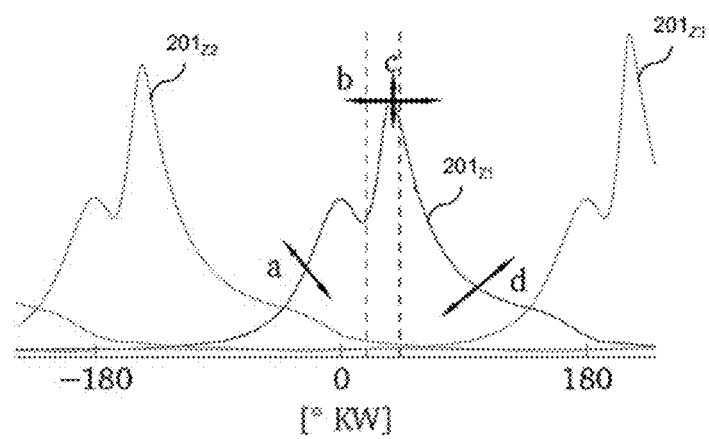
FIG. 5 shows a diagram of a cylinder pressure profile in a cylinder of the internal combustion engine as per FIG. 1 with the parameters for the implementation of the method as per FIG. 4.

As can be seen from FIG. 5, in the exemplary embodiment, the pressure profile $201_{Z1}$ is assigned multiple characteristic parameters a, b, c and d of the corresponding peculiarity of the pressure profile of the cylinder Z1 under consideration. Exemplary parameters will be presented below, the peculiarities of which are sensitive to a pressure deviation which has its origin in the respectively presented subsystem (for example fuel system, intake air system, ignition system).

The main influences of the fuel system, in particular the deviation type of an incorrect fuel mass V, are replicated in the exemplary embodiment by variations of the parameter c and to a lesser extent the parameter b, in each case along the plotted double arrow.

The intake air system—in particular the deviation type of a leakage L and the associated decrease of the air mass m available for the combustion—is replicated in particular by the parameters a and d and the variation thereof along the plotted double arrows, but also to a lesser extent by the parameter c and to an even lesser extent by the parameter b.

The ignition system—in particular the deviation type of a faulty electrode spacing and the associated low or absent ignition energy E—is replicated by the parameters b and c.

From the exemplary deviation types or fault types of fuel system, intake air system and ignition system, it thus becomes clear here that the faulty subsystem can be identified by means of pattern recognition adapted to the diagnostic situation and/or classification on the basis of the position or peculiarity of the parameters a, b, c and d.

Figure 6:
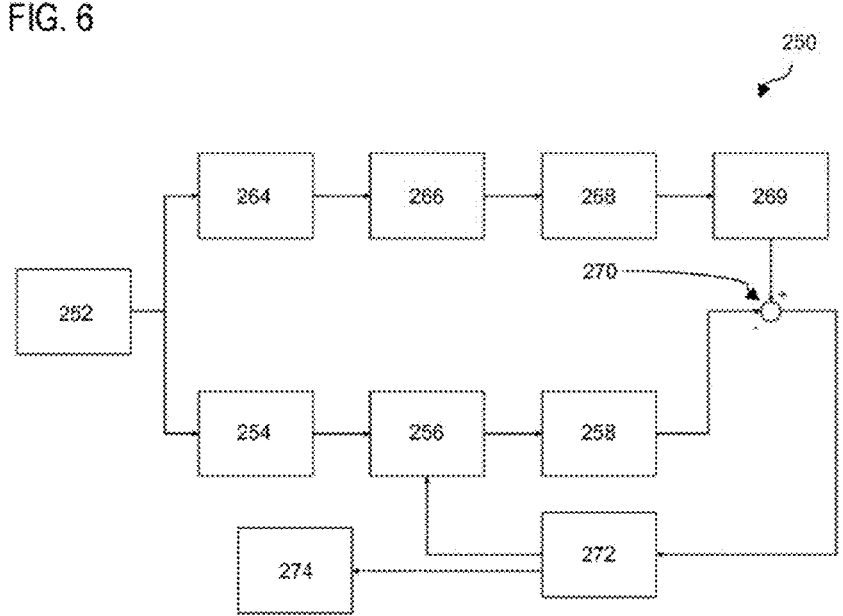
FIG. 6 shows a flow diagram with method steps for the implementation of the method as per FIG. 4.

As illustrated by way of example in FIG. 6, for a diagnosis, it is possible in a recursive or closed-loop method 250 for the parameters a, b, c and d of the pressure profile $201_{Z1}$ under consideration to be adapted such that the present rotational speed profile 101 can be replicated by means of a physical model of the crank drive.

For this purpose, on the basis of a driver demand 252, the input variables 254 for the setpoint state are defined or learned, in particular also the setpoint cylinder pressure profile 256.

From this, on the basis of a crankshaft model which replicates the mechanism of the crank drive, it is possible to calculate a setpoint rotational speed profile 258 at the crankshaft KT.

The setpoint rotational speed profile 258 may subsequently be compared with an actual rotational speed profile 268 by means of corresponding signal analysis 270, wherein this is possibly preceded by a calculation step 269 with a reduction to relevant engine orders of the actual values. The actual rotational speed profile 268 may in particular be ascertained as described above from an actual pressure profile 266 (may for example correspond to the pressure profile $201_{Z1}$), which in turn is dependent on the input variables 264 (in particular m, V and E).

In the event of faults in one of the subsystems, deviations arise here at the comparison 270. By means of parameter optimization 272 of the parameters a, b, c and d defined above, this error can be minimized until a sufficiently accurate result is found.

In particular if a method according to this exemplary embodiment of the invention is applied to an Otto-cycle engine, it is necessary, owing to the cycle fluctuations, and in particular the effect thereof on the peculiarity of the parameter c, to ensure that no over-optimization occurs, and the natural standard deviation of the process is taken into consideration.

Subsequently, the optimized parameters a, b, c and d can be evaluated in the context of pattern recognition 274. Since all parameters a, b, c and d have been selected with a physical background, the pattern recognition 274 may be of either a heuristic or model-based nature.

The schematic sequence of the diagnostic method 250 can thus be seen in FIG. 6. For another exemplary application, it is also possible for a considerably greater number of parameters which describe the cylinder pressure (in particular over and above the parameters a, b, c and d which are used by way of example) to be defined, including parameters which do not have a direct physical background; in particular also functional approaches which merely approximate the profile. The subsequent fault diagnosis is however then a black box model, which can be interpreted only with difficulty and requires a considerably greater amount of training data.

LIST OF REFERENCE DESIGNATIONS

1 Internal combustion engine
1 Diagnostic tool
4 Processing unit
6 Acquisition unit for the rotational speed of the crankshaft
7 Pressure acquisition unit
9 Intake system
10 Torque profile of the internal combustion engine over one engine cycle
12 Torque dropouts
14 Predetermined threshold for relevant torque contribution
100 Diagram of rotational speed development
101 Rotational speed profile
112 Diagnosis time window
201 Profile of the cylinder pressure
250 Method according to FIG. 4
252-274 Method steps
a, b, c, d Parameters
ATL Exhaust-gas turbocharger
KT Crank drive
KW Crank angle
L Potential leakages
LF Air filter
LS Air manifold
M Torque of a cylinder in FIG. 1
n Rotational speed
p Cylinder pressure in FIG. 1
P1, P2 Measurement times at the start and at the end of the diagnosis time window
R Potential mechanical fault as a result of piston/cylinder friction
Z Cylinder
ZZP Ignition time of a cylinder.

What is claimed is:

1. A method for diagnosing charge exchange behavior of an internal combustion engine with multiple cylinders, the method comprising the steps of:
   determining a diagnosis time window within a torque dropout of one of the strokes of the internal combustion engine;
   identifying at least one of the cylinders, which is in a compression stroke at the start of the diagnosis time window;
   assigning a deviation type to the identified cylinder in a manner dependent on an ascertained rotational speed development of the internal combustion engine during the diagnosis time window; and
   wherein for assigning the deviation type, the method comprises the steps of:
   ascertaining a peculiarity of a charge exchange characteristic variable on the basis of the ascertained rotational speed development;
   comparing the ascertained peculiarity with predetermined peculiarities of the charge exchange characteristic variable which are assigned to different deviation types; and
   assigning a deviation type to the determined diagnosis time window in accordance with the result of the comparison.

2. The method according to claim 1, wherein
   for ascertaining the rotational speed development, a rotational speed difference is calculated from a rotational speed value at a start of the diagnosis time window and a rotational speed value at an end of the diagnosis time window.

3. The method according to claim 2, wherein
   a pressure characteristic number calculated on the basis of the ascertained rotational speed difference, said rotational speed difference being ascertained in the compression stroke, is used as the charge exchange characteristic variable.

4. The method according to claim 1, wherein
for ascertaining the rotational speed development, a continuous rotational speed profile during the diagnosis time window is ascertained.

5. The method according to claim 4, wherein
the ascertained rotational speed profile is used as the charge exchange characteristic variable.

6. The method according to claim 1, wherein
for ascertaining the rotational speed development, a pressure profile in the cylinder during the diagnosis time window is ascertained.

7. The method according to claim 6, wherein
at least one curve parameter of the ascertained pressure profile is used as the charge exchange characteristic variable.

8. A diagnostic tool for diagnosing charge exchange behavior of an internal combustion engine with multiple cylinders, comprising:
a rotational speed acquisition unit which is configured to acquire a rotational speed of a crankshaft of the internal combustion engine;
a processing unit which is configured to control the rotational speed acquisition unit, wherein the processing unit is configured to:
determine a diagnosis time window within a torque drop-out of one of the strokes of the internal combustion engine,
identify at least one cylinder, which is in a compression stroke at the start of the diagnosis time window,
assign a deviation type to the identified cylinder in a manner dependent on an ascertained rotational speed development of the internal combustion engine during the diagnosis time window, and
wherein for assigning the deviation type, the processing unit is configured to:
ascertain a peculiarity of a charge exchange characteristic variable on the basis of the ascertained rotational speed development,
compare the ascertained peculiarity with predetermined peculiarities of the charge exchange characteristic variable which are assigned to different deviation types, and
assign a deviation type to the determined diagnosis time window in accordance with the result of the comparison.

9. The diagnostic tool according to claim 8, wherein
for ascertaining the rotational speed development, a rotational speed difference is calculated from a rotational speed value at a start of the diagnosis time window and a rotational speed value at an end of the diagnosis time window.

10. The diagnostic tool according to claim 9, wherein
a pressure characteristic number calculated on the basis of the ascertained rotational speed difference, said rotational speed difference being ascertained in the compression stroke, is used as the charge exchange characteristic variable.

11. The diagnostic tool according to claim 8, wherein
for ascertaining the rotational speed development, a continuous rotational speed profile during the diagnosis time window is ascertained.

12. The diagnostic tool according to claim 11, wherein
the ascertained rotational speed profile is used as the charge exchange characteristic variable.

13. The diagnostic tool according to claim 8, wherein
for ascertaining the rotational speed development, a pressure profile in the cylinder during the diagnosis time window is ascertained.

14. The diagnostic tool according to claim 13, wherein
at least one curve parameter of the ascertained pressure profile is used as the charge exchange characteristic variable.

15. An internal combustion engine with multiple cylinders, comprising a diagnostic tool according to claim 8.

16. The internal combustion engine according to claim 15, wherein
the internal combustion engine has four cylinders.

17. The internal combustion engine according to claim 15, wherein
the internal combustion engine has a four-stroke engine.

* * * * *